Aug. 22, 1944.　　　J. H. WILDMAN　　　2,356,292

TIRE PROTECTOR DEVICE

Filed Sept. 21, 1942

INVENTOR.
JACK H. WILDMAN
BY Edward C. Healy
ATTORNEY

Patented Aug. 22, 1944

2,356,292

UNITED STATES PATENT OFFICE 2,356,292

TIRE PROTECTOR DEVICE

Jack H. Wildman, San Francisco, Calif.

Application September 21, 1942, Serial No. 459,163

2 Claims. (Cl. 280—158)

This invention relates to improvements in ejectors and has particular reference to a means associated with the body of a motor vehicle or the like and the rear double wheels thereof, whereby the walls of the tires mounted on the wheels are protected from injurious contact therewith of stones, crushed rock and other foreign matter that would have the tendency to become imbedded in the tire walls.

The principal object of the invention is the provision of a simple and most efficient attachment that can be readily secured to the floor of the truck body, and when so mounted in operative position with relation to the inner side walls of the double tires will positively prevent the imbedding of foreign matter in the tire walls.

Another object of the invention is the provision of means to permit the ready removal of the bottom portion of the attachment should a change of a tire or a wheel be necessary.

A further object of the invention is the provision of spring means embodied in the attachment to absorb rebound and to prevent a locking of the arms adjacent the wheels when the vehicle is travelling over uneven surfaces.

Other objects and advantages will be apparent during the course of the following description.

Figure 1:
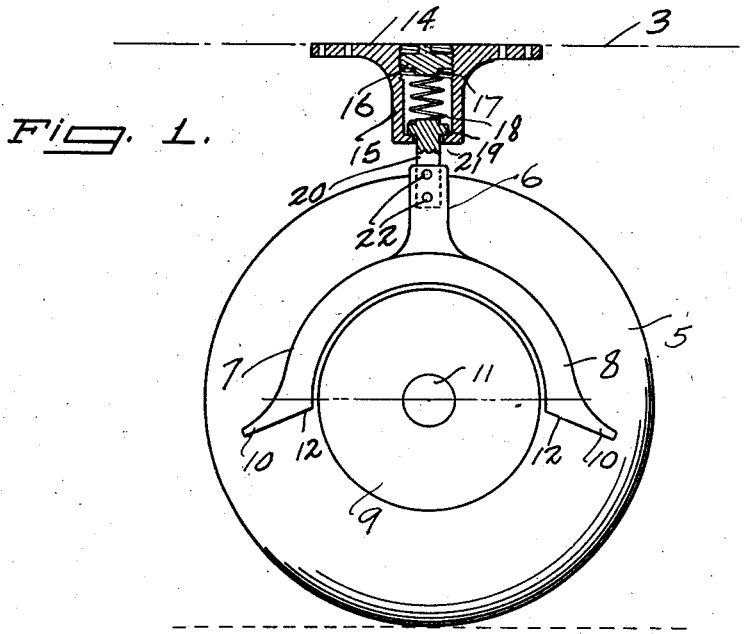
Figure 2:
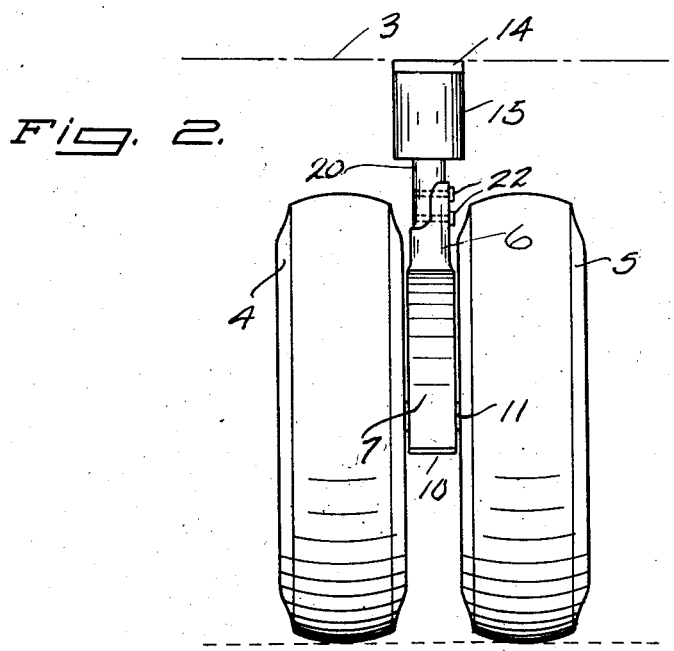

In the accompanying drawing forming a part of the specifications and in which like numerals are employed to designate like parts throughout the same, Fig. 1 is a side elevational view of the inner tire of a pair of double tires, the attachment being shown partly in section and partly in elevation, and likewise disclosing the relationship of the complete device relative to the flooring of the truck and one of the rear wheels and the tire mounted thereon;

Fig. 2 is a rear elevation of the attachment disclosing the same as secured to the vehicle flooring and its position between a pair of double tires.

The tires of trucks and other vehicles used in the military service and in private industries, are subject to considerable wear, and particularly is this so where the roads are not completely surfaced and when crushed rock is used as a subsurface on such roads. To compensate for the heavy duty of the type of vehicle specified, double or twin wheels are generally employed. In the movement of the vehicles over such roads, loose rock becomes wedged between the tires of the double wheels. These rocks having sharp and jagged edges, when impinged between the tires, grind and cut the rubber through to the fabric and often the fabric itself. Accordingly, when the side walls are thus weakened or broken, the life of the tire is gone and recapping is of no avail. To eliminate this great loss of valuable rubber and also the loss of time in replacing damaged tires, I have devised the present invention wherein I employ an automatic mechanism for immediately ejecting the rocks, thereby positively protecting the walls of the tire and prolonging the life of the same when rubber is so needed in the present emergency.

In the accompanying drawing the numeral 3 designates the flooring of a motor vehicle, preferably a truck, on which the double tires are generally employed. A pair of such tires are designated by the numerals 4 and 5. My attachment comprises a hollow shaft portion 6 having a pair of curved arms 7 and 8 integrally formed therewith. These arms, as it will be noted, are positioned between the tires and fit concentrically over the division of the wheels. As will be noted and disclosed in Fig. 2, sufficient clearance is provided between the sides of the arms 7 and 8, and as disclosed in Fig. 1, sufficient space is permitted for clearance between the under surface of the arms and the wheel 9. I also propose to extend the ends 10 of the arms below the wheel hub 11, the ends being tapered and enlarged as at 12 to provide a larger impeding surface to the rock or stones displaced from the roadbed over which the vehicle is travelling.

To support the shaft and arms of the attachment and to retain the same in operating position, I employ a bracket that is secured to the truck flooring 13. This bracket embodies in its construction a flat top plate 14 and a cylindrical housing 15. A threaded cap or plug 16 engages the internal threads of the bracket housing, said cap being equipped with a shoulder 17 that engages the upper end of a spring 18, the lower end of the spring in turn contacting a shoulder 19 provided on a shank 20 vertically movable through the aperture 21 of the housing.

It will be noted that the lower end of the shank is detachably secured by bolts or other suitable fastening means 22 to the upper end of the recessed or hollow shaft 6. Thus a jointed connection is realized between the respective shafts, and accordingly the lower portion of the device can be readily removed as a whole from the upper portion should this operation be necessary.

In practice the device is secured as a unit to the flooring of the truck and assumes the position illustrated in the figures of the drawing. The curved arms 7 and 8 with their enlarged tapered ends will serve as a guard to prevent flying rock from lodging between the tire walls, while the spring will readily absorb rebound and will prevent the shaft from breaking or the arms locking against the wheels when the vehicle is moving over uneven surface.

From the foregoing description considered in connection with the accompanying drawing, it will be obvious that I have devised a most efficient, economical, durable and highly serviceable device that will readily accomplish the objects of the invention.

It is to be understood that the form of the invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:

1. In combination with a motor vehicle body and the double wheels thereof, of a device positioned between the inner walls of a pair of tires mounted on the wheels of the vehicle body for protecting the tire walls against stones displaced from a road bed, a bracket secured to the vehicle and connected to said device, means for removably securing the device to said bracket, and resilient means carried by said bracket permitting vertical movement of said device relative to said bracket.

2. In combination with a motor vehicle body and laterally spaced dual wheels carried thereby, of a device positioned between the wheels for protecting the tire walls of the wheels against stones displaced from a roadbed, said device comprising a shaft having a pair of downwardly extending curved arms, the ends of the arms being enlarged and tapered.

JACK H. WILDMAN.